J. L. SHANKLAND.
AIRPLANE BODY.
APPLICATION FILED AUG. 23, 1919.
1,384,784.
Patented July 19, 1921.
4 SHEETS—SHEET 3.
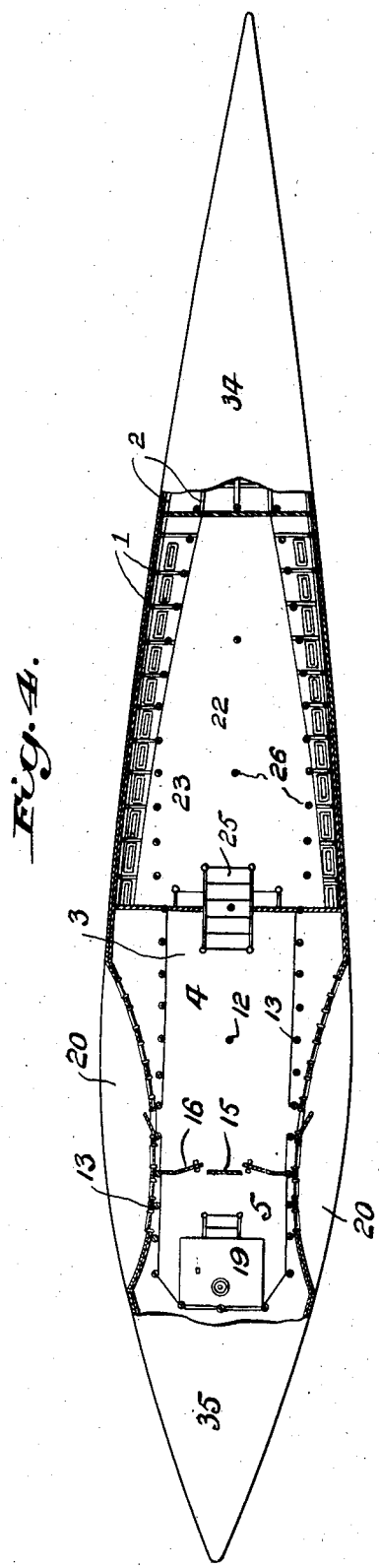
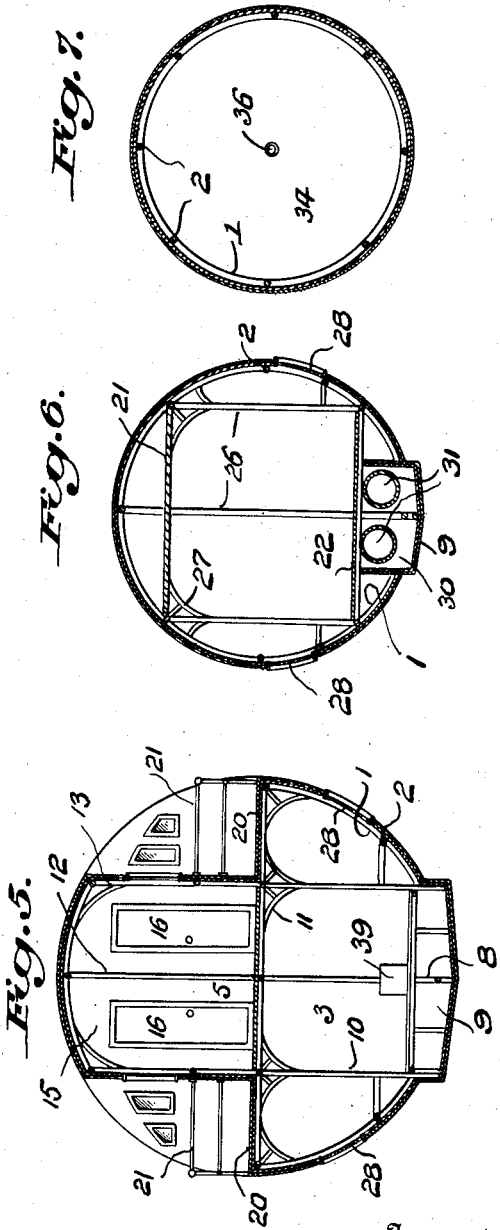
Inventor
James L. Shankland
By
Attorneys

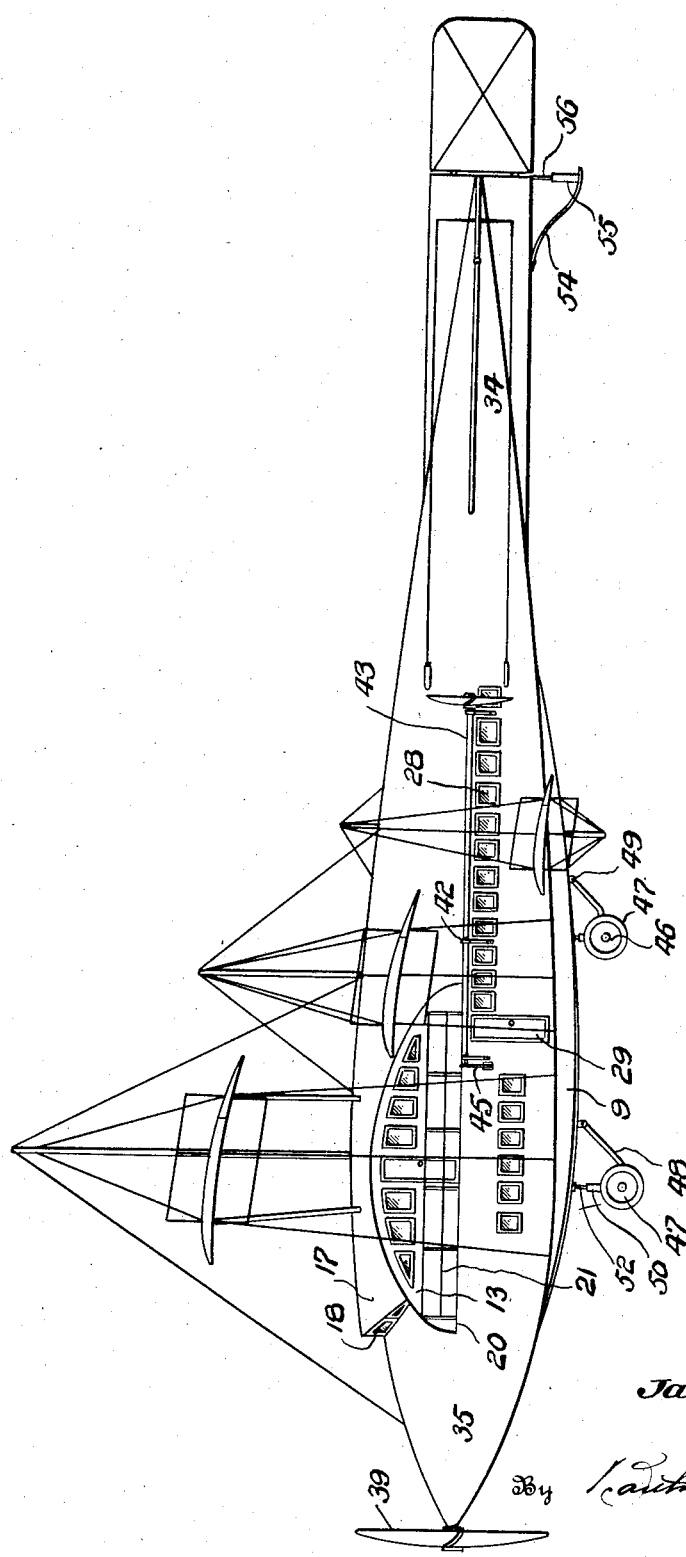

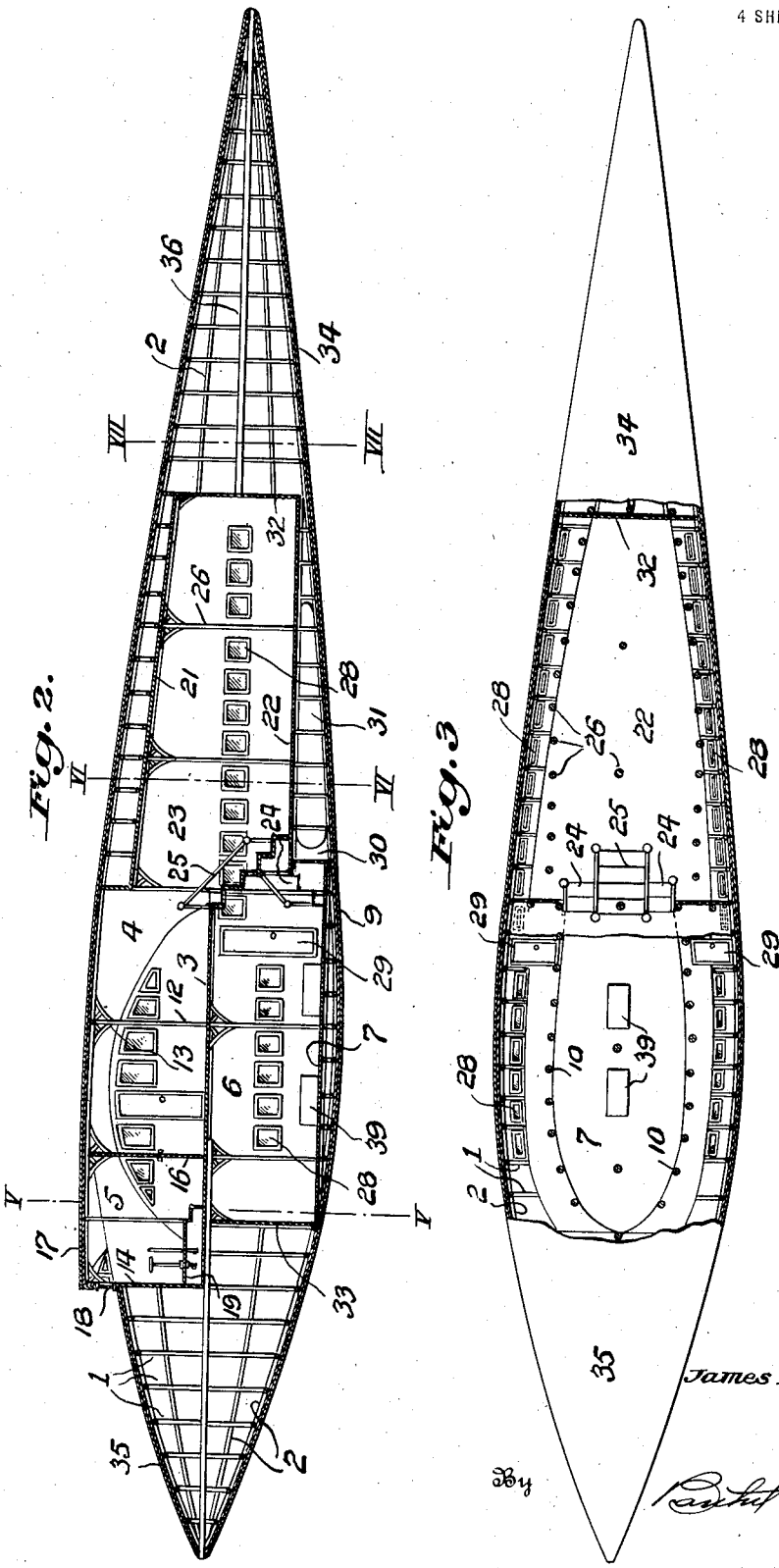

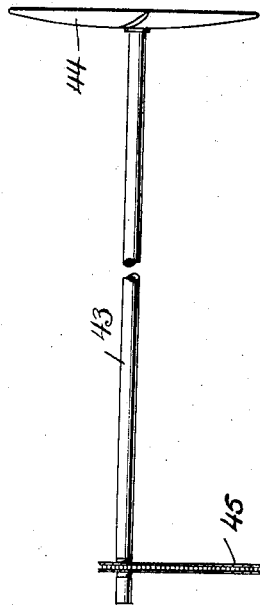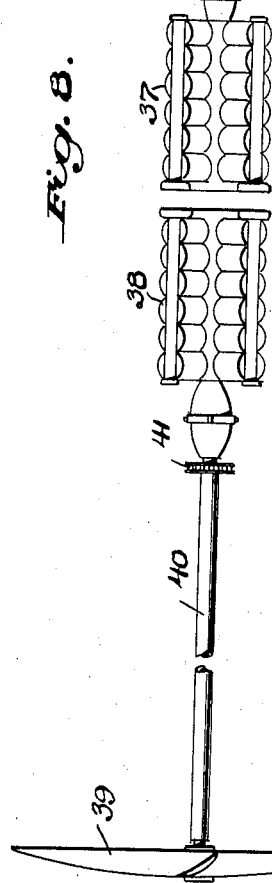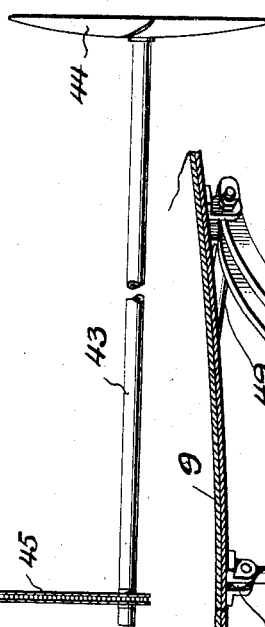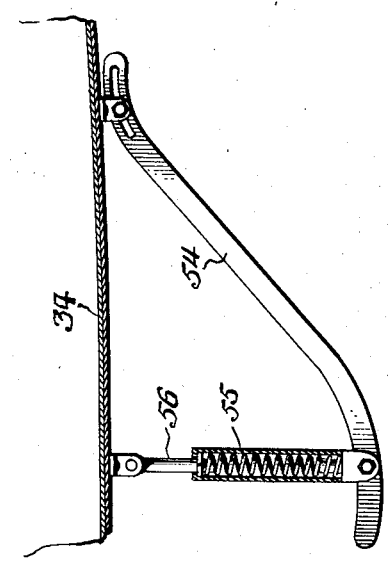

UNITED STATES PATENT OFFICE.

JAMES L. SHANKLAND, OF TORONTO, ONTARIO, CANADA.

AIRPLANE-BODY.

1,384,784. Specification of Letters Patent. Patented July 19, 1921.

Application filed August 23, 1919. Serial No. 319,375.

*To all whom it may concern:*

Be it known that I, JAMES L. SHANKLAND, a subject of the King of Great Britain, residing at Toronto, in the county of York, Province of Ontario, Canada, have invented certain new and useful Improvements in Airplane-Bodies, of which the following is a specification, reference being had therein to the accompanying drawings.

This invention relates to a flying machine body or fuselage, and my invention aims to provide a body of stream line design to avoid head resistance, and of such size that it may be used for passengers and freight traffic.

My invention further aims to provide a body or fuselage that may be advantageously used as part of a tri-plane, and it is in this connection that my companion application, filed under even date, discloses an aerofoil construction for the body made the subject of this application.

My invention still further aims to provide a strong, durable and rigid body construction which will provide upper and lower cabins, an engine room, a pilot room, and storage space, all of large capacity and properly balanced and proportioned relative to other parts of the body. A portion of the body, particularly at the upper cabin thereof, affords decks, and besides said body having the necessary sustaining means for flight, it is equipped with all the necessary appurtenances for landing, either on land or water; steering; propulsion, and perfect control.

The body construction will be better understood when reference is had to the drawings, wherein—

Figure 1 is a side elevation of the flying machine provided with a body in accordance with this invention;

Fig. 2 is a vertical longitudinal sectional view of the body;

Fig. 3 is a plan of the same, partly broken away and in horizontal section;

Fig. 4 is a similar view showing other portions of the body;

Fig. 5 is a cross sectional view taken on the line V—V of Fig. 2;

Fig. 6 is a similar view taken on the line VI—VI of Fig. 2;

Fig. 7 is a similar view taken on the line VII—VII of Fig. 2;

Fig. 8 is a diagrammatic plan of a propulsion means of the body;

Fig. 9 is a detail view of a skid, and

Fig. 10 is a perspective view of a portion of a landing carriage.

The frame of the body is composed of a large number of rings 1, preferably made of hollow steel tubes, disposed in vertical parallel planes and equally spaced throughout the entire length of the body with the rings of the greatest diameter arranged amidship and the remaining rings gradually decreasing in diameter toward the nose and tail of the body, so that the frame has somewhat of a "cigar" shape. The rings 1 are connected by longitudinal tie rods or members 2 of the same material as the rings 1, and said longitudinal members are spaced and suitably connected to each ring so as to maintain the rings in spaced relation to form a rigid skeleton framework. At some places amidship the body the rings and the members are bent or interrupted for other structures which will be hereinafter considered.

On the metallic skeleton frame is placed a cover of spruce, aluminum or other light and durable material and when the frame is inclosed by a spruce cover, aeroplane linen may inclose the spruce cover and be varnished or otherwise finished to provide a water proof smooth structure.

Amidship is a horizontal partition or floor 3 forming the floor of an upper cabin 4 and a pilot room 5, the former being in advance of the latter. The floor 3 also forms a ceiling of an engine room 6 which has a floor 7 of less width than length than the floor 3. The greater part of the floor 7 is supported by upright tubes 8 and these tubes may be located in a depressed portion 9 of the body frame, as shown in Fig. 5, said depressed portion of the body frame forming a longitudinal float member below the body, as shown in Fig. 1. The float member may be a detachable or separate member connected to the rings 1 of the body, thus eliminating the depressed portion of the body, and in some instances the float may be built into the body to preserve the stream-lines thereof.

The floor 3 is supported in the body frame by uprights 10 and the braces 11 within the engine room 6 and above the floor 3 are uprights 12, side walls 13, and transverse partitions 14 and 15, said partitions forming the front and rear walls of a pilot room 5, with the partition 15 provided with doors 16 leading from the upper cabin 4 into the pilot room 5. It is in connection with the pilot room 5 that the frame of the body is interrupted sufficiently to form a raised ceiling 17 providing an observation window 18 in the upper portion of the partition 14, so that a pilot on a platform 16 within the room 5 may make forward observations.

The side walls 13 of the cabin 4 and the room 5 represent concave portions of the body frame and these side walls are provided with windows and doors, as shown in Fig. 2, the doors leading on to decks 20 formed by the side edges of the floor 3, and as shown in Fig. 5, the decks have railings 21 so that the crew and passengers carried within the body may go outside of the body at any time.

Considering the lower cabin within the body, there are transverse partitions 21 and 22 forming the ceilings and floor respectively of an oblong compartment or cabin 23 which communicate with the upper cabin 4 by a central stairway 25 and with the engine room 6 by a side stairway 24. As shown in Fig. 6 the ceiling and floor of the cabin 23 are braced by a multiplicity of uprights 26 and braces 27 and light is admitted to the lower cabin, as well as the engine room 6, by windows 28 in the body frame. The body frame may also have side doors 29 leading to the engine room 6, contiguous to the stairway 24.

Below the cabin floor 22 are compartments 30 for longitudinally disposed fuel tanks 31, said fuel tanks being shaped so as to occupy all the available space possible below the cabin floor or in the float member 9 of the body.

The lower cabin 23 has a rear end wall 32 and the engine room 6 has a front end wall 33, the end walls 32 and 33 being in the form of transverse partitions at the tail portion 34 and the nose portion 35 of the body frame, these tail and nose portions being devoid of any compartments, but affording sufficient space for the storage of equipment, ballast, or other matter. The nose and tail portions of the body may also have central tie members 36 and any other reinforcing structures.

Considering the propulsion means of the body, as best shown in Figs. 1 and 8, engines 37 and 38 are mounted on foundations 39 within the engine room 6. The engine 38 is employed for operating a forward propeller 39 which is in the axis of the body and has its shaft 40 suitably journaled in the nose portion 35 of the body frame. A suitable power transmission device, generally designated 41, may transmit power from the engine 38 to the shaft 40.

The sides of the framework of the body are provided with suitable bearings 42 for side propeller shafts 43 which have the rear ends thereof provided with propellers 44.

Power transmission devices, generally designated 45, are employed for transmitting power from the engine 37 to the propeller shafts 43. The side propellers 44 are adapted to push the flying machine and the front propellers 39 to pull the same, the front propeller being equal in power to the side propellers, but driven in an opposite direction from said side propellers which operate in the same direction. The engines 38 and 37 represent a suitable power plant that may be utilized for other purposes in or about a flying machine and it is obvious that the same will be sufficiently large to insure a desired speed in connection with the flying machine.

Below the float member 9 of the flying machine are landing carriages, (one in advance of the other) and a portion of one of these carriages has been shown in Fig. 10, as consisting of an axle 46 provided with wheels 47. The axle is loose in the slotted ends of parallel arms 48 pivotally supported by a transverse rod 49 carried by the float member 9. On the axle 46, between the arms 48, are spring housings 50 for coiled springs 51 and extending into said spring housings are plungers 52 pivotally connected, as at 53, to the float member 9. The carriage is yieldably supported and the springs 51 within the housings 50 serve as shock absorbers, so that the flying machine may safely land and be supported relative to the ground.

The tail portion 34 of the flying machine has a yieldable skid 54 adapted to coöperate with the landing chassis or carriage said skid being shaped somewhat similar to a runner and having one end thereof pivotally connected to a spring housing 55 in which extends a plunger 56, said spring housing and plunger being constructively arranged similar to the spring housing and plunger of a landing carriage. The rear end of the skid 54 is loosely connected to the tail portion of a flying machine and is adapted to prevent the tail portion from being injured by contacting with the ground or any obstruction.

While in the drawings there are illustrated the preferred embodiments of my invention, it is to be understood that the structural elements are susceptible to such variations and modifications as fall within the scope of the appended claims.

What I claim is:—

1. A flying machine body having superposed floors entirely within said body providing an engine room and a pilot room and an upper cabin above the engine room with the pilot room on the same plane as the upper cabin and overhanging the forward end of the engine room, said machine body having the walls thereof inset to provide decks at the upper cabin, and a floor and ceiling in the rear of said superposed floors providing a lower cabin of greater depth than said engine room and communicating with said upper cabin and said engine room.

2. A tri-plane body having an upper cabin, a lower cabin, said cabins being amidship said body, a cabin in the rear of said upper and lower cabins, stairways connecting said lower cabin and said rear cabin, and a stairway between said stairways connecting said rear cabin and said upper cabin.

3. A tri-plane body having the walls thereof inset to provide decks, and superposed cabins in said body with the uppermost cabin on a level with the decks of said body.

In testimony whereof I affix my signature in the presence of two witnesses.

JAMES L. SHANKLAND.

Witnesses:
CHESTER W. MARTIN,
H. W. ATMORE.